Patented June 23, 1936

2,044,956

UNITED STATES PATENT OFFICE 2,044,956

INHIBITOR AND PROCESS EMPLOYING THE SAME

Fred E. Sheibley, Cleveland Heights, Ohio, assignor to The Grasselli Chemical Company, Cleveland, Ohio, a corporation of Delaware No Drawing. Application February 2, 1935, Serial No. 4,631

16 Claims. (Cl. 148—8.1)

This invention relates to the effect of acids upon metal, and is particularly directed to processes and compositions which employ, in conjunction with an acid, an inhibitor characterized by the presence of the group:

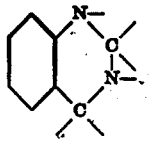

Pickling and metal cleaning operations frequently involve the use of a bath of dilute, non-oxidizing acids such as sulfuric, hydrochloric, acetic, formic, aqueous solutions of acid sulfates, and the like. Such baths are used for numerous purposes, a typical example of which is the pickling of iron or steel articles such as wire, sheet, and other manufactures. The composition, concentration, temperature of operation, and other factors vary with different baths, but in every instance the primary function of a bath is the removal of undesirable incrustations. As soon as the base metal becomes exposed, it is, in the absence of an inhibitor, attacked by the bath with consequent damage to the article and with an unnecessary consumption of acid.

The application of my invention to acid pickling and acid metal cleaning operations involves no changes in the customary baths and processes, except for the addition of a small amount of the inhibitors of this application. In quantities as small as one-hundredth of one per cent, my novel inhibitors will check the attack of acid on metal. I usually prefer to employ between about two-hundredths of one per cent and one-tenth of one per cent of one of my inhibitors, but more or less may be used if desired. The compounds discussed hereinafter were tested by using one-hundred and twenty-five ten thousandths of a per cent, based on the weight of the bath, in a five per cent sulfuric acid solution.

It will, of course, be apparent that my novel inhibitors may be used in numerous other relations as have the inhibitors already known to the art.

I have found very satisfactory as inhibitors compounds which contain the group:

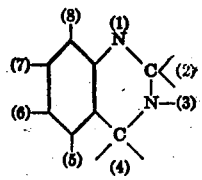

It is noted that the positions on the above group are numbered in accordance with standard practice, and in accordance with the terminology used herein.

The inhibitors of my invention may, for lack of better terminology, be designated as derivatives of quinazoline which contain the above indicated nucleus (1). It will be understood, of course, that while the compounds may all conceivably be derived from quinazoline, it is frequently more practicable to prepare them from other compounds.

In one broad aspect, my invention contemplates the use of compositions of the formula:

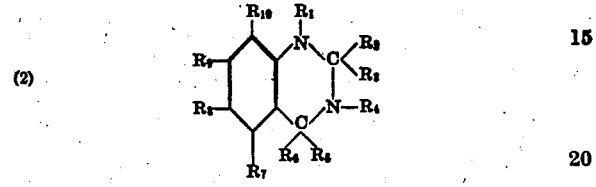

in which the valence at $R_1$ is satisfied by hydrogen, a monovalent organic group, or else the valence is satisfied by the carbon in the 2-position; in which the valence at $R_2$ is satisfied by a monovalent sulfur-containing group, a monovalent oxygen-containing group, a monovalent organic group, hydrogen, by linkage to nitrogen in the 1-position, or satisfied, together with the valence at $R_3$, by oxygen, sulfur, or a divalent organic group; in which the valence at $R_3$, if not satisfied together with $R_2$, is satisfied by a monovalent sulfur-containing group, an amino group, a monovalent oxygen-containing group, a monovalent organic group, or by hydrogen; in which the valence at $R_4$ is satisfied by hydrogen, an amino group, a monovalent organic group, by linkage to the 4-carbon, or, if the N is pentavalent, by linkage to the 4-carbon and by the cation and anion of an acid; in which the valence at $R_5$ is satisfied by a monovalent sulfur-containing group, a monovalent oxygen-containing group, a monovalent organic group, hydrogen, linkage to the nitrogen in the 3-position, or satisfied, together with the valence at $R_6$, by oxygen, sulfur, or a di-valent organic group; in which the valence at $R_6$, if not satisfied together with $R_5$, is satisfied by a monovalent sulfur-containing group, an amino group, a monovalent oxygen-containing group, a monovalent organic group, or hydrogen; and in which the valences at $R_7$, $R_8$, $R_9$, and $R_{10}$ are satisfied by substituents for the hydrogen of the benzene ring, or by the hydrogen of the ring.

The physical characteristics and the activity of the compounds represented by the Formula (2) vary considerably with variations in the nature of the groups at $R_1$, $R_2$, $R_3$, etc. The properties of a large number of representative members of this large class of compounds will be discussed in detail hereinafter.

Generally speaking, quinazoline derivatives of the type of Formula (2) are most effective as inhibitors when they contain sulfur. A few exceptions to this statement will be discussed in detail hereinafter, and, as will then be noted, 2,4-dianilinoquinazoline-o,o'-dicarboxylic acid dimethyl ester hydrochloride, particularly, is an astonishingly excellent inhibitor despite the fact that no sulfur is present.

It is usually preferable to locate the sulfur in the 2-position. The 4-position is more reactive, and the sulfur, if at the 4-position, is more susceptible to oxidation and hydrolysis. Compounds with sulfur in the 2-position are fairly easily made, and they are relatively stable.

Oxygen and hydrogen are more easily retained in the 4-position, as are organic groups. However, in view of the greater reactivity of the 4-position, it is generally preferable to locate organic groups in the 2-position, unless, of course, it is desired to have organic groups in both.

In choosing between the 1-position and the 3-position, it is preferable to locate a given group in the 3-position. A compound with a given group in the 3-position is usually more easily dispersed than a similar compound with the given group in the 1-position. For instance, 2-thio-3-allyl-4-ketotetrahydroquinazoline is an excellent inhibitor, easily soluble in acetone, and readily dispersible in an acid bath; while 1-allyl-2-thio-4-ketotetrahydroquinazoline is a somewhat poorer inhibitor by reason of the difficulty experienced in dispersing it in an acid bath. For purposes of comparison, the formulae of the compounds are given herewith:

(3) 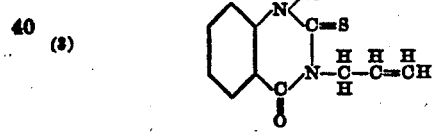

2-thio-3-allyl-4-ketotetrahydroquinazoline—

(4) 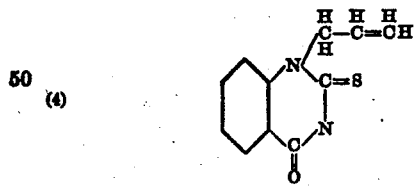

1-allyl-2-thio-4-ketotetrahydroquinazoline—

Various groups may be located at the 5-, 6-, 7-, and 8-positions with considerable success. One or more alkyl or aryl groups may be substituted on the benzene ring, and, if desired, one or more carboxyl groups may be similarly located. Other substituents such as nitro-groups, —SH, etc., may likewise be used. Generally speaking, I prefer not to substitute halogen on the benzene ring, for, as will be seen hereinafter, such compounds are not overly satisfactory as inhibitors.

Generally, I prefer to employ my compounds in as pure a state as is commercially feasible, because, as will be pointed out hereinafter, crude, impure products do not have as great an inhibiting efficiency as do the purified products. It will be understood, however, that I do not limit myself to purified products, because, in many cases, it may be economically desirable to use a less expensive product even tho it is not quite as efficient as it would be in its refined, but more expensive form.

My novel inhibitors may be dispersed in acid baths in any suitable manner. Some are not readily dispersible, and it is preferable to add such compounds to a bath after first dispersing (or dissolving) them in a suitable solvent. Most of the compounds discussed herein were tested by dispersing them in acetone, tho, in some cases, other methods were found more suitable. In connection with my specific examples, given hereinafter, I shall indicate the methods of dispersion used with each compound. It will, of course, be readily apparent that any suitable method of dispersion may be employed, and numerous ways will readily occur to those skilled in the art. Besides using suitable solvents for the inhibitors, they may be dispersed for example, by adding suitable dispersing agents such as gum arabic, Goulac, saponin, and the like. Many of the compounds of my invention are readily dispersible in an acid bath by simply adding the compounds to the bath, and no particular attention is required as to their method of addition.

In alkaline solution some of my compounds undergo a desmotropic conversion with the formation of alkaline salts. I may use such compounds in the form of their alkaline salts, but I generally prefer not to. It would be expected that in an acid bath the original compound would be regenerated, but in some cases this is not entirely true. It will be noted hereinafter, in connection with specific examples, that certain of the compounds of my invention are not as desirable as inhibitors when added to an acid bath in alkaline solution.

A little more specifically considered than in Formula (2), my inhibitors are comprised of compounds of the formula:

(5) 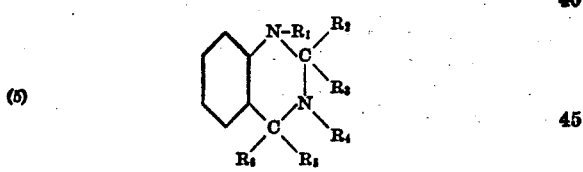

in which the valence at $R_1$ is satisfied by hydrogen, an alkyl, aryl, or aralkyl group, or else the valence is satisfied by the carbon in the 2-position; in which $R_2$ is satisfied by the nitrogen in the 1-position, or by hydrogen, an alkyl, aryl, aralkyl, alkoxy, aryloxy, amino, arylamino, or alkylamino group, or satisfied, together with the valence at $R_3$, by oxygen or sulfur; in which the valence at $R_3$, if not satisfied together with the valence at $R_2$, is satisfied by hydrogen, an alkyl, aryl, aralkyl, alkoxy, aryloxy, amino, arylamino, or alkylamino group; in which the valence at $R_4$ is satisfied by hydrogen, an alkyl, aryl, aralkyl, amino, arylamino, or alkylamino group, or by the valence at $R_5$; in which the valence at $R_5$ is satisfied by the nitrogen in the 3-position, or by hydrogen, an aryl, alkyl, aralkyl, alkoxy, aryloxy, amino, arylamino, or alkylamino group, or satisfied, together with the valence at $R_6$, by sulfur or oxygen; and in which the valence at $R_6$, if not satisfied together with $R_5$, is satisfied by hydrogen, an alkyl, aryl, aralkyl, alkoxy, aryloxy, amino, alkylamino, or arylamino group.

In one rather specific aspect of my invention, I contemplate the use of a group of compounds which may be designated as derivatives of normal, or unreduced, quinazoline. This group of compounds has the following formula:

(6) 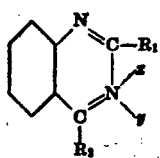

in which the valence at $R_1$ is satisfied by hydrogen, or by an alkyl, aryl, aralkyl, alkoxy, aryloxy, alkylamino, or arylamino group; in which the valence at $R_2$ is satisfied by hydrogen, or by an alkyl, aryl, aralkyl, alkoxy, aryloxy, alkylamino, or arylamino group; and in which $x$ and $y$ are the cation and anion of an acid if the nitrogen in the 3-position is pentavalent.

The simplest member of this group is quinazoline itself, in which $R_1$ and $R_2$ are both hydrogen. Quinazoline is a crystalline solid which melts at 48° C., and which is very soluble. When a small amount of quinazoline was added to a sulfuric acid bath, it was found to be none too satisfactory an inhibitor.

In the following tables are listed a number of typical examples of members of this group. The specific manner of addition of the compounds to a sulfuric acid bath is noted. The compounds of the second table are hydrochloric acid salts. The compounds of each table are listed in approximately the decreasing order of their efficiencies as inhibitors under the specific conditions noted herein.

This compound was prepared by reacting 2,4-dichloroquinazoline with methyl anthranilate. It has a melting point of 261° C. The position of attachment of the hydrogen chloride has not been directly demonstrated, but from the empirical evidence available to me, it seems most probable that the HCl is located as shown in Formula (7). The HCl in Compounds 6, 7, and 8, is probably similarly located, and, for the purposes of this application, I shall refer to such acid containing products as salts.

As is noted in Table 2, 2,4-dianilinoquinazoline-o,o'-dicarboxylic acid dimethyl ester hydrochloride was added to a sulfuric acid bath in acetone solution with excellent results. Although this compound contains no sulfur, it displayed an exceedingly great efficiency as an inhibitor. By the standard loss of weight method of determination, this compound was found to have an efficiency only a fraction of a per cent below 100%.

The Compound 7 of Table 2, 2,4-dianilinoquinazoline-m,m'-dicarboxylic acid hydrochloride, and Compound 8, 2,4-dianilinoquinazoline-p,p'-dicarboxylic acid hydrochloride, proved less efficient than Compound 5, probably in part because of their poorer dispersion.

The Compound 1 of Table 1, 2,4-dianilinoquinazoline, was found to be about as efficient as Compounds 7 and 8 under the conditions of the tests. The Compound 4 of Table 1, 2,4-diethoxyquinazoline, despite its good dispersion in the sulfuric acid bath, was the poorest inhibitor of the group.

In a second rather specific aspect of my in-

TABLE 1

Examples of compounds according to Formula (6)

| No. | $R_1$ | $R_2$ | Appearance | Mode of addition to bath |
|---|---|---|---|---|
| 1 | $NHC_6H_5$ | $NHC_6H_5$ | Small pale yellow needles | In acetone: Poor dispersion. |
| 2 | $NHC_6H_5$ | $OCH_3$ | Small, white glistening plates | In acetone: Good dispersion. |
| 3 | H | $NHC_6H_5$ | Orange brown needles | Direct to bath: Good dispersion. |
| 4 | $OC_2H_5$ | $OC_2H_5$ | Small white needles | In acetone: Good dispersion. |

TABLE 2

Additional examples of compounds of Formula (6):—Containing HCl

| No. | $R_1$ | $R_2$ | Appearance | Mode of addition to bath |
|---|---|---|---|---|
| 5 | $o$-$NHC_6H_4COOCH_3$ | $o'$-$NHC_6H_4COOCH_3$ | Yellow, crystalline powder. | In acetone: Good dispersion. |
| 6 | $NHC_6H_5$ | $NHC_6H_5$ | Pale yellow powder | In conc. sulfuric acid: Poor dispersion. |
| 7 | $m$-$NHC_6H_4COOH$ | $m'$-$NHC_6H_4COOH$ | White, fluffy powder | In conc. sulfuric acid: Poor dispersion. |
| 8 | $p$-$NHC_6H_4COOH$ | $p'$-$NHC_6H_4COOH$ | Pale yellow powder | In conc. sulfuric acid: Poor dispersion. |

The best of the inhibitors of this group is No. 5. This is 2,4-dianilinoquinazoline-o,o'-dicarboxylic acid dimethyl ester hydrochloride, which has the following formula:

(7) 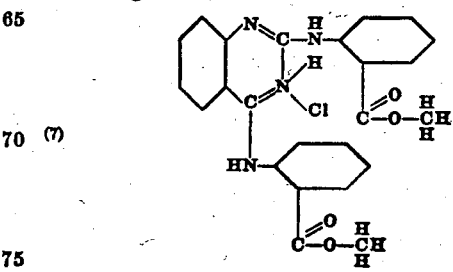

vention, I contemplate the use, as inhibitors, of compounds which may be designated as derivatives of 4-ketodihydroquinazoline. This group of compounds has the formula:

(8)

in which the valence at $R_1$ is satisfied by hydrogen, or by an alkyl, aryl, aralkyl, alkoxy, aryloxy, alkylamino, or arylamino group; and in which the valence at $R_2$ is satisfied by hydrogen, or by an alkyl or aryl group.

In the following table are listed a number of examples of compounds of the type of Formula (8). As in Tables 1 and 2, the compounds are listed in approximately the decreasing order of their efficiencies:

TABLE 3

*Examples of compounds according to Formula (8)*

| No. | $R_1$ | $R_2$ | Appearance | Mode of addition to bath |
|---|---|---|---|---|
| 9 | $CH=CHC_6H_5$ | H | Fine, white needles. | In hot alcohol: Good dispersion. |
| 10 | $C_6H_5$ | H | Fine, chalky needles. | In acetone: Good dispersion. |
| 11 | H | H | Asbestos-like needles. | In acetone: Good dispersion. |
| 12 | $OC_6H_5$ | H | Fine, white needles. | In acetone: Good dispersion. |
| 13 | $OCH_3$ | $CH_3$ | Fine, white needles. | In acetone: Good dispersion. |
| 14 | $OC_2H_5$ | H | Long, slender needles. | In acetone: Good dispersion. |
| 15 | $NHC_6H_5$ | H | Crude product used. | In conc. sulfuric acid: Good dispersion. |

The compounds of this group are, generally, lower in efficiency than the compounds of Formula (6). The Compound No. 9, 2-styryl-4-keto-dihydroquinazoline, has the following formula:

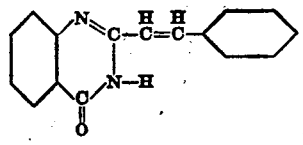

(9)

This compound is the most satisfactory inhibitor of this group, and I believe that it is the presence of the unsaturated side chain which causes the compound to be better than others of this group. One of my preferred inhibitors, noted hereinafter, likewise contains an unsaturated side chain.

The compound 11, 4-ketodihydroquinazoline is not overly efficient as an inhibitor, but it may sometimes be found efficient enough for particular uses. It can assume an enolic form thus:

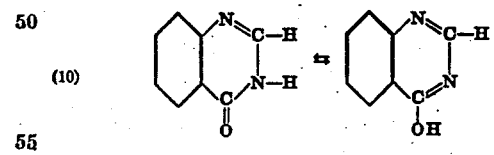

(10)

Because of this desmotropism, 4-ketodihydroquinazoline resembles phenol in that the OH group acts as an "acid" group and the compound forms sodium salts in a manner analagous to the formation of sodium phenolate. More will be said regarding these sodium compounds hereinafter.

In a third rather specific aspect of my invention, I contemplate the use, as inhibitors, of compounds which may be designated as derivatives of 2,4-diketotetrahydroquinazoline. This group of compounds has the formula:

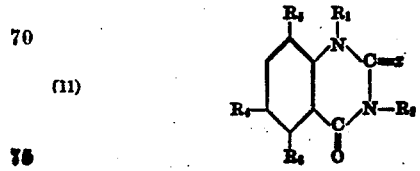

(11)

in which the valence at $R_1$ is satisfied by hydrogen or by an alkyl group; in which the valence at $R_2$ is satisfied by hydrogen, or by an alkyl, aryl, or aralkyl group, in which the valences at $R_3$, $R_4$, and $R_5$ are satisfied by the hydrogen of the benzene ring, or by nitro groups, halogen groups, or carboxylic acid groups; and in which the valences at $x$ are satisfied by oxygen or sulfur.

In the following table are listed a number of examples of compounds of the group of Formula (11) in which $x$ is oxygen. The compounds are listed in approximately the decreasing order of their effectiveness:

TABLE 4

*Examples of compounds according to Formula (11)*

| No. | $R_1$ | $R_2$ | $R_4$ and $R_5$ | $R_3$ | Appearance | Mode of addition to bath |
|---|---|---|---|---|---|---|
| 16 | H | H | H | H | Small, white needles | In conc. sulfuric acid: Good dispersion. |
| 17 | H | H | $NO_2$ | H | Yellow prisms | In conc. sulfuric acid: Good dispersion. |
| 18 | $C_2H_5$ | $CH_3$ | H | H | Fine, white needles | In acetone: Good dispersion. |
| 19 | H | H | H | COOH | Crystalline powder | In conc. sulfuric acid: Good dispersion. |
| 20 | $CH_3$ | $C_2H_5$ | H | H | Fine, white needles | In acetone: Good dispersion. |
| 21 | $C_2H_5$ | H | H | H | Granular, white crystals | In alcohol: Good dispersion. |
| 22 | H | H | Br | H | Yellow needles | In conc. sulfuric acid: Poor dispersion. |
| 23 | H | $C_2H_5$ | Br | H | Glistening, white needles | In conc. sulfuric acid: Poor dispersion. |

Generally speaking, when $x$ is oxygen the members of this group are poorer inhibitors than those of the foregoing two groups.

The substitution of groups in the benzene ring modifies the properties of the compounds to a very considerable extent. The substitution of a carboxyl group at the 5-position made the 2,4-diketotetrahydroquinazoline more soluble and somewhat more easily dispersible. The substituted Compound No. 19 is 2,4-diketotetrahydroquinazoline-5-carboxylic acid with the following formula:

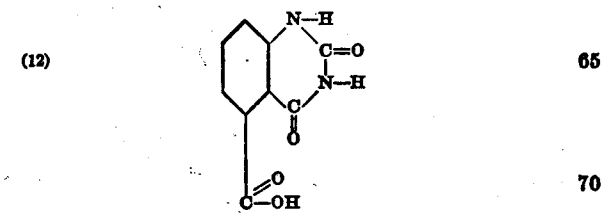

(12)

The halogen substituted Compounds No. 22, 6,8-dibromo-2,4-diketotetrahydroquinazoline, and No.

23, 3-ethyl-6,8-dibromo-2,4-diketotetrahydroquinazoline, are exceedingly poor inhibitors, and, while I intend to cover them in my claims, I do not prefer to use them in most relations. These compounds have the formulæ:

(13) 6,8-bromo-2,4-diketotetrahydroquinazoline.

(14) 3-ethyl-6,8-dibromo-2,4-diketotetrahydroquinazoline.

Compound No. 16, 2,4-diketotetrahydroquinazoline, may be used in the form of its alkaline salts, for, like 4-ketodihydroquinazoline, it can undergo a desmotropic transformation according to the following:

When 2,4-diketotetrahydroquinazoline (15a) is put in alkaline solution, it is converted to the desmotropic forms (15b) and (15c). The hydroxyl group in the active 4-position is acidic, and the compound will form alkaline salts. When 2,4-diketotetrahydroquinazoline is put in a sodium hydroxide solution, for instance, the following compounds form:

The hydroxyl group in the 2-position is relatively inactive, and it is believed that very little, if any, of the compound (16c) will react to form a disodium salt.

As another example of the formation of alkaline salts of inhibitors according to my invention, the desmotropic conversion of 3-phenyl-2,4-diketotetrahydroquinazoline is shown below at (17b) and the sodium salt at (17c). It is noted that the 3-phenyl-2,4-diketotetrahydroquinazoline is slowly converted, and, therefore, is slowly soluble in alkali.

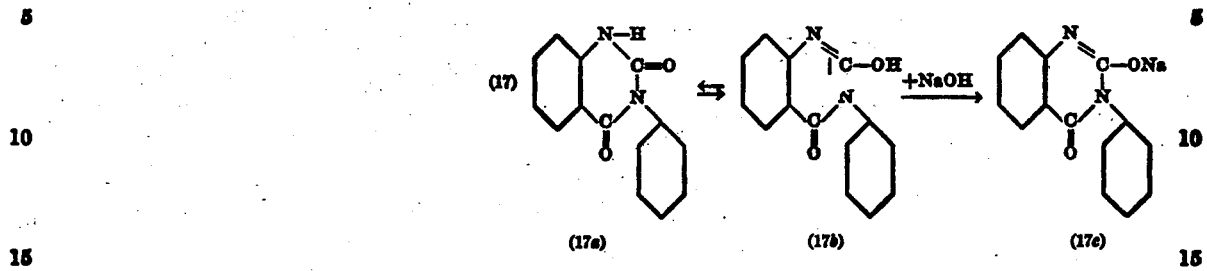

The presence of a group other than hydrogen on the nitrogen atoms will, of course, prevent a desmotropic conversion, and such compounds as No. 13, No. 18, etc. are not alkali soluble, and will not form salts with alkaline agents. The compounds of the type of Formula (6) do not contain a carbonyl group, and, of course, they have no enol form.

A large number of the compounds of my invention are alkali soluble, and they may be added to an acid bath in the form of their salts. As further examples, I may note Compounds No. 9, No. 10, and No. 17.

While I may add my compounds in the form of their alkaline salts, if any, I usually prefer not to. One would expect the salts to be converted to the original compound, but, as will be noted hereinafter, some of my compounds are less satisfactory when used in the form of their sodium salts.

Among the most efficient and most satisfactory of my novel inhibitors, are the compounds of Formula (11) when $x$ is sulfur. The compounds now to be discussed are included in the discussion of Formula (11), and, as $x$ is sulfur, this group may be regarded, rather specifically, as derivatives of 2-thio-4-ketotetrahydroquinazoline of the formula:

(18)

in which the valence at $R_1$ is satisfied by hydrogen or by any alkyl group; and in which the valence at $R_2$ is satisfied by hydrogen, or by an alkyl, aryl, or aralkyl group.

A few examples of compounds according to Formula (18) are given below in approximately the decreasing order of their efficiencies. Under the heading "Appearance" are noted the appearances of the compounds and the solvents from which the compounds were crystallized in their preparation.

TABLE 5

Examples of compounds according to Formula (18)

| No. | R₁ | R₂ | Appearance | Melting point | Mode of addition to bath |
|---|---|---|---|---|---|
| 24 | H | C₃H₅ | White, prismatic needles: from alcohol | 203° C | In acetone: Good dispersion. |
| 25 | H | C₆H₅ | White, glistening plates: from glacial acetic acid | | In acetone: Good dispersion. |
| 26 | H | o-CH₃C₆H₄ | White, glistening flakes: from glacial acetic acid | 265° C | In acetone: Good dispersion. |
| 27 | H | p-CH₃C₆H₄ | White, glistening plates: from glacial acetic acid | | In acetone: Poor dispersion. |
| 28 | CH₃ | C₆H₅ | Thin, opaque needles: from benzene | 288° C | In conc. sulfuric acid: Good dispersion. |
| 29 | CH₃ | CH₃ | Short, white needles: from benzene | 182° C | In conc. sulfuric acid: Good dispersion. |

The above compounds were prepared by reacting an appropriate alkyl or aryl isothiocyanate with anthranilic or N-methylanthranilic acid. Compound 24, for instance, was prepared by refluxing allyl isothiocyanate with anthranilic acid. Other methods of preparation may, obviously, be used.

The Compound No. 24, 2-thio-3-allyl-4-ketotetrahydroquinazoline, gave the best results of any of the compounds tested, both from the standpoint of efficiency and from the standpoint of the brightness of the acid treated articles. This compound is shown below in its usual form (19a) and in its desmotropic conversion (19b).

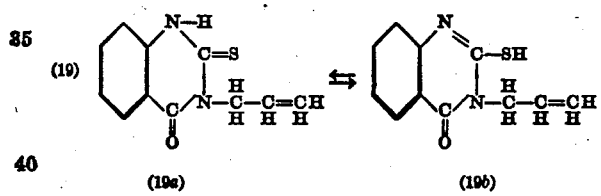

(19) (19a) (19b)

This compound formed sodium salts, but, peculiarly enough, when it was dispersed in a pickling bath by slowly adding a solution of it in aqueous sodium hydroxide, it acted as an excellent inhibitor for a short time and then became very low in efficiency. I do not prefer, therefore, to use this compound in the form of its sodium salts.

As is noted above, it is preferable to use my compounds in a relatively pure form. A crude uncrystallized specimen of Compound No. 25, 2-thio-3-phenyl-4-ketotetrahydroquinazoline, was almost ten per cent lower in efficiency than the crystallized product. Similarly, an unpurified specimen of Compound No. 24, 2-thio-3-allyl-4-ketotetrahydroquinazoline, was less efficient than the purified product.

The Compound No. 25, 2-thio-3-phenyl-4-ketotetrahydroquinazoline, is one of my preferred inhibitors. It is readily dispersible in a pickling bath, and it is a very efficient inhibitor. It has the following formula:

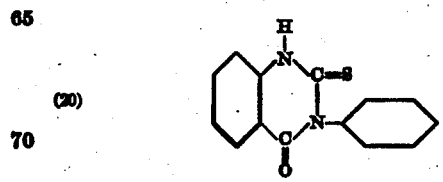

(20)

The first four compounds in Table 5 were all found to be very satisfactory inhibitors, as each left an excellent, bright finish on articles treated with baths containing them, and as each was of high efficiency.

In addition to the compounds falling in one of the above groups, there are, of course, numerous other compounds which fall within the scope of my invention. While, as is above noted, I prefer to use compounds with sulfur, if any, in the 2-position, I may also use compounds with sulfur in the 4-position. I may, for example, use compounds of the type of 2-methyl-4-thiodihydroquinazoline:

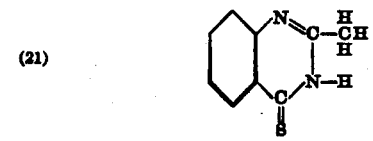

(21)

Another interesting compound which has sulfur in the 4-position in 2,4-dithiotetrahydroquinazoline:

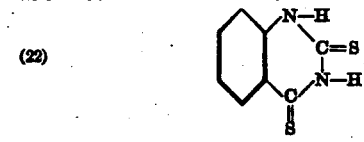

(22)

Compounds of the type of Formulæ (21) and (22) are not overly satisfactory because the sulfur in the 4-position is very susceptible to oxidation and hydrolysis.

The inhibitors of my invention may be employed in similar manner to the inhibitors known heretofore. They may be sold in the form of impure commercial compounds, or in the form of relatively pure compounds. It may sometimes be desirable to sell mixtures of the compounds of my invention with each other or with known inhibitors. My inhibitors may, of course, be marketed as such, or they may be mixed with dispersing agents and/or foaming agents such as Goulac, saponin, soap bark, and gum arabic. It may sometimes be found desirable to sell the inhibitor in a suitable solvent, or to sell it already mixed with acid.

While I have shown certain specific compositions and certain methods of preparing them, I do not intend to be limited thereby. It will be readily apparent to those skilled in the art that numerous equivalent compounds can be used, and that my compounds can be used alone or in various mixtures in numerous relations without departing from the spirit of my invention. The scope of my invention is set forth in the following claims.

I claim:

1. A pickling and cleaning composition comprising a non-oxidizing acid and a composition comprising a compound characterized by the presence of the group:

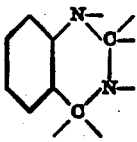

2. A pickling and cleaning composition comprising a non-oxidizing acid and a composition comprising 2-thio-3-allyl-4-ketotetrahydroquinazoline.

3. A pickling and cleaning composition comprising a non-oxidizing acid and a composition comprising 2,4-dianilinoquinazoline-o,o'-dicarboxylic acid dimethyl ester hydrochloride.

4. A pickling and cleaning composition comprising a non-oxidizing acid and a composition comprising 2-styryl-4-ketodihydroquinazoline.

5. In a process of treating metal, the step comprising subjecting the metal to the action of an acidic material inhibited by a composition comprising a material characterized by the presence of the group:

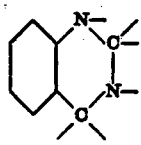

6. A pickling and cleaning composition comprising a non-oxidizing acid and a derivative of normal quinazoline characterized by the presence of the group:

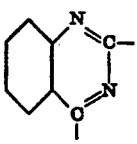

7. A pickling and cleaning composition comprising a non-oxidizing acid and a derivative of 4-ketodihydroquinazoline characterized by the presence of the group:

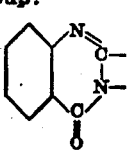

8. A pickling and cleaning composition comprising a non-oxidizing acid and a derivative of 2,4-diketotetrahydroquinazoline characterized by the presence of the group:

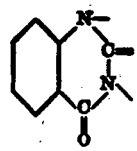

9. A pickling and cleaning composition comprising a non-oxidizing acid and a derivative of 2-thio-4-ketotetrahydroquinazoline characterized by the presence of the group:

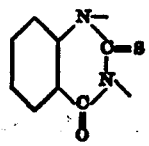

10. In a process of cleaning and pickling metals, the step comprising subjecting the metal to the action of a composition of claim 2.

11. In a process of cleaning and pickling metals, the step comprising subjecting the metal to the action of a composition of claim 3.

12. In a process of cleaning and pickling metals, the step comprising subjecting the metal to the action of a composition of claim 4.

13. In a process of cleaning and pickling metals, the step comprising subjecting the metal to the action of a composition of claim 6.

14. In a process of cleaning and pickling metals, the step comprising subjecting the metal to the action of a composition of claim 7.

15. In a process of cleaning and pickling metals, the step comprising subjecting the metal to the action of a composition of claim 8.

16. In a process of cleaning and pickling metals, the step comprising subjecting the metal to the action of a composition of claim 9.

FRED E. SHEIBLEY.